Sept. 8, 1936.  J. RENDLEMAN  2,054,044
PACKAGE
Filed Sept. 21, 1935
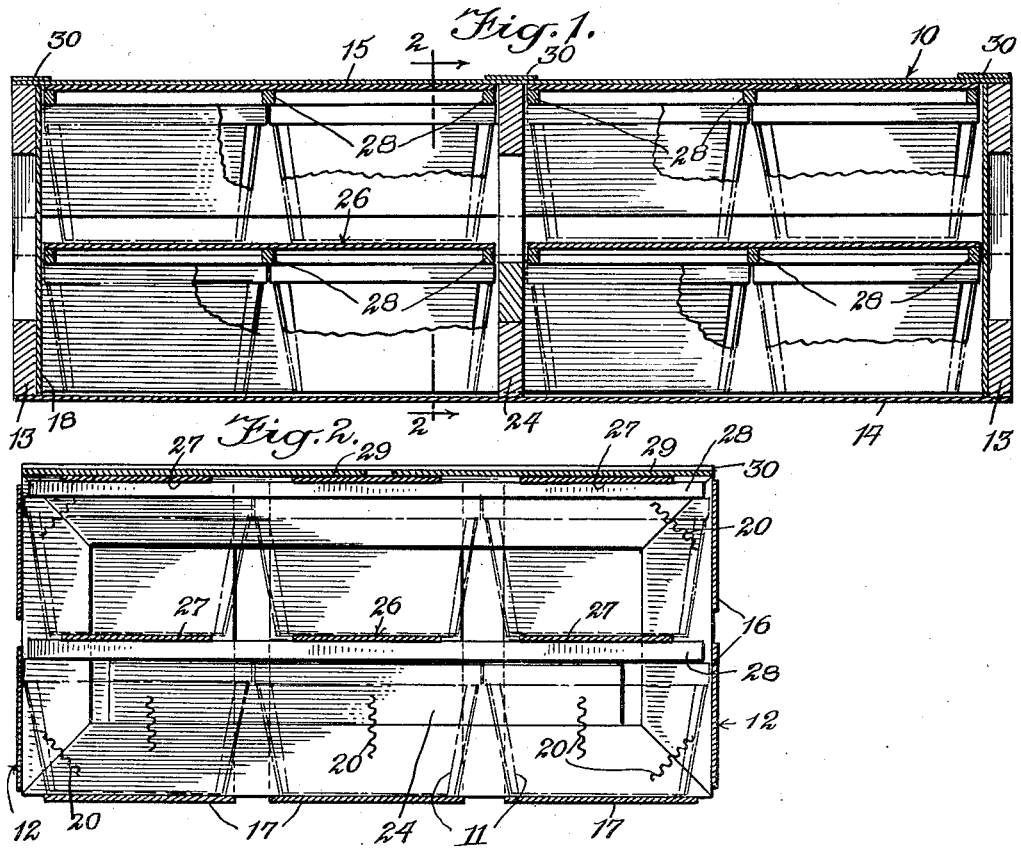
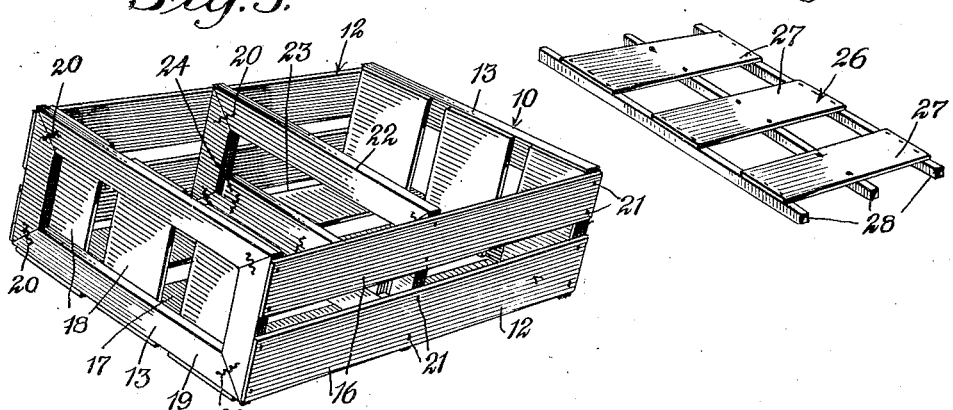
WITNESSES
INVENTOR
Julius Rendleman
BY
ATTORNEYS Patented Sept. 8, 1936

2,054,044

UNITED STATES PATENT OFFICE 2,054,044

PACKAGE

Julius Rendleman, Alto Pass, Ill., assignor to Fruit Growers Package Company, Jonesboro, Ill., a corporation of Illinois Application September 21, 1935, Serial No. 41,601

1 Claim. (Cl. 217—40)

This invention relates to improvements in packages, and has specific relation to improvements in crates for packing and shipping and displaying small boxes or cartons of fruit, berries, and the like.

It is an object of this invention to provide an improved crate which will hold a plurality of berry or fruit boxes firmly in position, and will protect the fruit or berries from being bruised or crushed, and which will afford ample ventilation for the fruit or berries.

A further object is the provision in a crate of the above type of means for retaining the contents of the fruit or berry boxes inside of the boxes and preventing them from spilling, and for giving support to superimposed layers of boxes where several layers are packed in the crate without crushing the fruit or berries.

Among other objects is the provision of an improved crate of rugged construction which will not spread or pull apart adjacent its central portion, but will retain its shape, thereby holding the contents firmly in position, and which will when the cover has been removed afford an attractive display package for displaying the boxes of berries or fruit contained therein.

In the accompanying drawing:

Fig. 1 is a longitudinal, sectional view of my improved package showing fruit or berry boxes disposed in rows inside the crate, some of the boxes being shown in dotted lines so as to more clearly reveal the construction of the crate;

Fig. 2 is a transverse, sectional view of my package in the direction of the arrows on the line 2—2 of Fig. 1;

Fig. 3 is a perspective view of an empty crate; and

Fig. 4 is a perspective view of a horizontal divider used in my package.

My improved package consists of a crate 10, in which are packed rows of fruit or berry boxes or cartons 11 of conventional size and shape. The crate may be either of a height to receive but a single layer of fruit or berry boxes 11, or may be of sufficient height to receive a plurality of superimposed layers. I prefer, however, to employ a crate of the type shown in the accompanying drawing, which is designed to receive two superimposed layers of boxes.

The crate consists of side members 12, end members 13, a bottom member 14, and a top 15. Each of the sides are preferably formed of a pair of horizontal slats 16 spaced apart so as to provide ventilation for the crate, the lower slat being of sufficient height to extend at least to the top of the lower layer of fruit or berry boxes disposed in the crate, while the upper slat extends at least to the top of the superimposed layer of fruit or berry boxes in the crate. The bottom 14 is formed of a plurality of longitudinally extending slats 17 and the ends 13 are formed of a plurality of vertically extending slats 18, the number of the slats in the ends preferably being the same as the number in the bottom of the crate, and the slats in both members being spaced apart to provide ventilation and being so positioned as to engage and provide support for the berry boxes disposed in the crate.

I have found that a convenient size crate is one which will hold three rows of boxes extending longitudinally of the crate, and accordingly the slats in both the bottom and end members are three in number and are positioned so as to engage the bottom and sides, respectively, of the adjacent boxes as shown in the drawing.

The slats 18 in the end members are secured to a rectangular frame 19, composed of a pair of uprights and cross members secured together at their ends by suitable fasteners 20, and the frame is secured as by nails 21 to the side and bottom members.

To provide additional strength and support for the crate, I divide it transversely by means of the supporting member 22 extending between the two sides 12 of the crate into two compartments, each of a size to receive a plurality of rows of berry boxes and to hold them against undue shifting.

The member 22 is provided with a central opening 23 to provide for circulation of the air in the crate, and may be in the form of a rectangular frame secured together at its corners by suitable fasteners 20 and fastened at its ends as by nails 21 to the sides of the crate. The lower portion of the frame, as at 24, should be of a sufficient height to engage the sides of the lower layer of abutting fruit or berry boxes adjacent the top and may either be formed in one piece or, as shown in the accompanying drawing, may be formed of two members, the uppermost one being secured to the lower one as by the fasteners 20. The top of the member 22 should likewise be so positioned as to engage the sides of the abutting berry or fruit boxes of the superimposed or upper layer.

Each of the compartments thus formed in the crate by the supporting member 22 is of a size and shape to receive a plurality of berry boxes and hold them firmly in position due to the interengagement between the sides of the boxes and the sides, ends and supporting member of the crate. I have found that a crate of convenient size is provided if each compartment is formed to receive two superimposed layers of small fruit or berry boxes, each layer consisting of six boxes, two rows of boxes extending transversely of the crate and three longitudinally of the crate, as shown in Figs. 1 and 2.

In packing my crate the lower layer of fruit or berry boxes is first placed in each of the compartments so that the boxes rest upon the slats 17 of the bottom of the crate, and with the upper end of the sides of the boxes engaging the slats 16 in the sides, the portion 24 of the central supporting member, and the slats 18 in the end of the box. A horizontal divider 26, shown in Fig. 4, of a size to fit into the compartments is then placed on top of the lower layer of boxes, and the upper or superimposed layer of boxes is then arranged on the divider.

The divider which extends substantially from side to side of the crate and from member 22 to the end is so constructed as to rest upon the upper end of the sides of the boxes, as shown more clearly in Fig. 1, so as to protect the berries or fruit in the boxes from being crushed, and is also provided with suitable means for supporting the upper layer of boxes. To this end the divider is formed of three slats 27 adapted to extend longitudinally of the crate, one slat for each of the longitudinal rows of boxes, and three supporting strips 28 which intersect the slats at right angles and are secured to the lower surface thereof.

The strips 28 extend transversely of the crate and are spaced the same distance apart as the width of the top of the fruit or berry boxes, so that they rest upon the upper edges of the berry boxes, as shown in Fig. 1. The slats 27 are wide enough to afford support for the upper layer of berry boxes and also may serve to prevent the contents of the lower boxes from spilling out into the crate.

When a divider 26 has been placed in position on top of the lower layer of boxes in each of the compartments, as shown in Fig. 1, the upper layer of boxes is then placed upon the divider in the same manner as the lower layer, there being two rows of boxes transversely of the crate and three rows longitudinally of the crate in each of the compartments. A second divider 26 is then placed upon the uppermost layer of boxes in each compartment, and the top of the crate is secured in position. The top preferably consists of a plurality of slats 29 which may be spaced apart and which are secured to the ends of the crate and to the member 22 by suitable fasteners such as nails, at which points reinforcing strips 30 may be superimposed upon the top to add strength thereto.

It will be seen that due to the spacing of the slats in the crate, ample ventilation is afforded to the contents thereof, and due to the construction of the dividers 26 and the central supporting member 22 the air in the crate will be permitted to circulate. The member 22 prevents the central portion of the crate from spreading, and due to this member and to the dividers 26 the fruit or berry boxes will be retained firmly in position and the fruit or berries will be protected from being bruised or crushed. When the top of the crate has been removed, it also will afford a convenient and attractive display device for displaying the berries or fruit contained therein.

Of course, modifications such as changing the crate so as to hold but one layer of fruit or berry boxes may be made in the illustrated and described embodiment of the invention without departing from the spirit of the invention, as defined in the accompanying claims.

I claim:

A package for fruit and the like comprising a crate having side, end, top and bottom members, and a supporting member of substantially the same height as said crate connected between the two sides thereof so as to divide the crate transversely into two compartments, two superimposed layers of a plurality of rows of containers disposed in each of said compartments, the lower layer in each compartment resting on the bottom member of the crate, and a pair of horizontal dividers in each compartment above each layer of containers comprising a plurality of slats spaced apart so as to provide for air circulation and arranged so as to be positioned centrally over the containers in the respective layers, and a plurality of intersecting strips secured to the lower surface of said slats and spaced apart and positioned so as to rest on the upper ends of the sides of the containers, the upper layer of containers resting on the slats of the lower dividers, the sides of said crate being formed of a pair of spaced horizontal slats to provide ventilation, the lower and upper slats being positioned respectively so as to engage the sides of the adjacent containers in the lower and upper layers respectively so as to prevent lateral shift movement of the containers, the ends of the crate being formed of a plurality of spaced vertical slats so as to provide ventilation, and positioned so as to engage the upper end of the sides of the adjacent containers, and said supporting member being formed with a central opening to provide for air circulation in the crate, and having members engaging the upper end of the sides of adjacent containers so as to serve in cooperation with the slats in the end members to prevent longitudinal shifting of said containers.

JULIUS RENDLEMAN.